US012726598B2

(12) United States Patent
Tsou et al.

(10) Patent No.: US 12,726,598 B2
(45) Date of Patent: Sep. 1, 2026

(54) IMAGE DISPLAY DEVICE

(71) Applicant: InnoLux Corporation, Miao-Li County (TW)

(72) Inventors: Yu-Shih Tsou, Miao-Li County (TW); En-Jie Chen, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 296 days.

(21) Appl. No.: 18/406,216

(22) Filed: Jan. 8, 2024

(65) Prior Publication Data

US 2024/0267496 A1 Aug. 8, 2024

(30) Foreign Application Priority Data

Feb. 8, 2023 (CN) ........................ 202310082868.X

(51) Int. Cl.
*G02B 5/08* (2006.01)
*G02B 30/56* (2020.01)
*H04N 9/31* (2006.01)

(52) U.S. Cl.
CPC ........... *H04N 9/3155* (2013.01); *G02B 30/56* (2020.01); *H04N 9/3102* (2013.01)

(58) Field of Classification Search
CPC ..... H04N 9/3155; H04N 9/3102; G02B 30/56
See application file for complete search history.

(56) References Cited

U.S. PATENT DOCUMENTS

| | | | | |
|---|---|---|---|---|
| 8,867,136 | B2 | 10/2014 | Hashikawa | |
| 10,739,613 | B2 | 8/2020 | Joseph | |
| 10,838,226 | B2 * | 11/2020 | Hatanaka | G02B 5/124 |
| 2016/0116886 | A1 | 4/2016 | Juni | |
| 2018/0203244 | A1 | 7/2018 | Hatanaka | |
| 2018/0259784 | A1 * | 9/2018 | Joseph | G02B 5/124 |

* cited by examiner

*Primary Examiner* — Euncha P Cherry
(74) *Attorney, Agent, or Firm* — Winston Hsu

(57) ABSTRACT

An image display device includes a display device and an optical modulator. The display device has a normal direction, the optical modulator is disposed on the display device, and an included angle θ is between the optical modulator and the display device, wherein the included angle θ ranges from 20 degrees to 70 degrees.

20 Claims, 9 Drawing Sheets

IMAGE DISPLAY DEVICE

BACKGROUND OF THE DISCLOSURE

1. Field of the Disclosure

The present disclosure relates to an image display device, and more particularly to an image display device having high displaying quality.

2. Description of the Prior Art

As the evolution and development of electronic devices, the electronic devices have become an indispensable item. Recently, the industry is committed to develop a display technology for floating images, thereby enhancing the viewing effect. However, according to the existing technology, the effect of the floating image still needs to be improved, and the huge volume of the device configured to display the floating image is not conducive to the use of the user.

SUMMARY OF THE DISCLOSURE

According to an embodiment, the present disclosure provides an image display device including a display device and an optical modulator. The display device has a normal direction, the optical modulator is disposed on the display device, and an included angle θ is between the optical modulator and the display device, wherein the included angle θ ranges from 20 degrees to 70 degrees.

DETAILED DESCRIPTION

Figure 1:
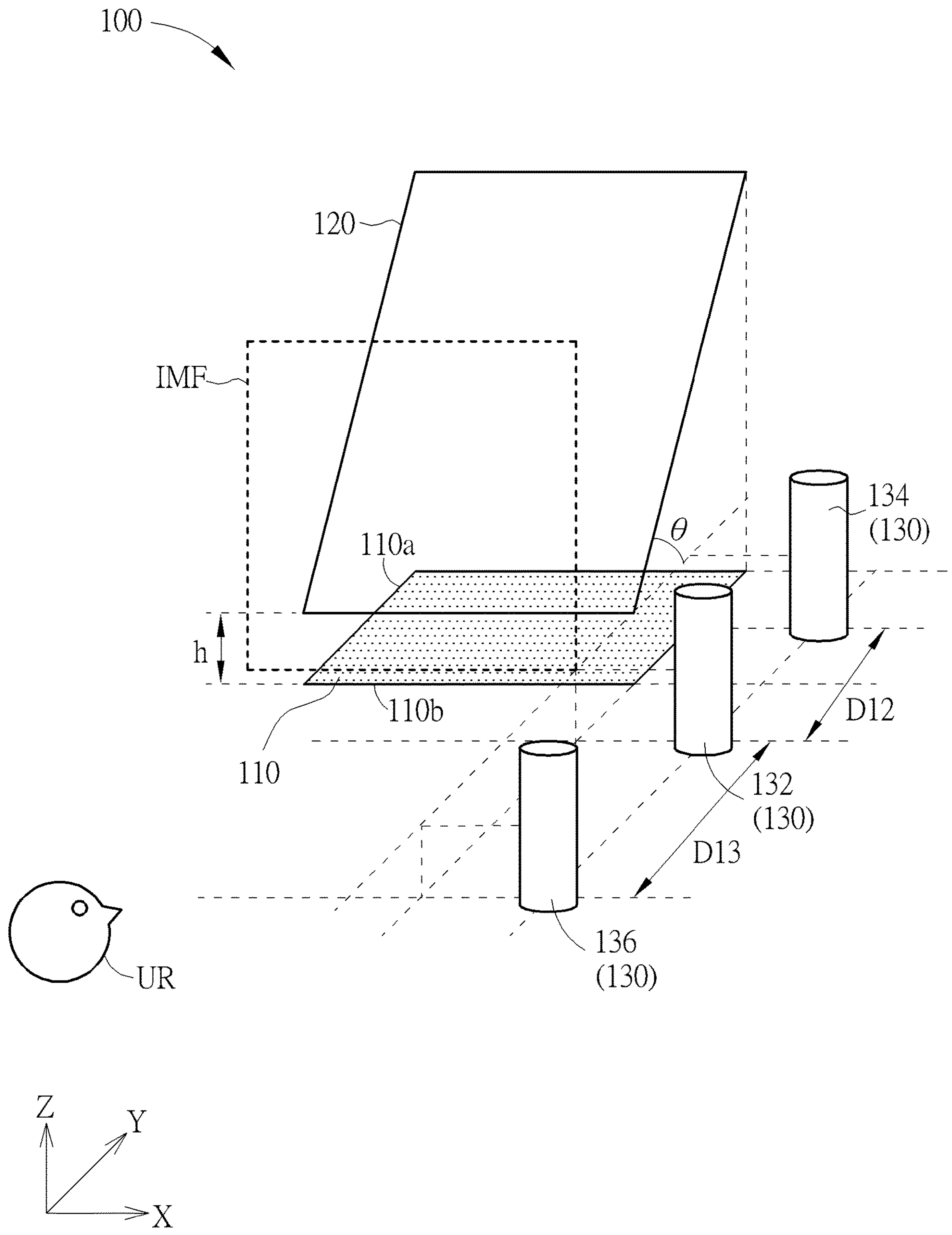
FIG. 1 is a schematic diagram showing an image display device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of an image display device in this disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component (s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view/vertical direction, the corresponding component may be below or above the another component, and the disposition relationship along the top-view/vertical direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component(s).

In the description and following claims, the term "horizontal direction" generally means a direction parallel to a horizontal plane, the term "horizontal plane" generally means a surface parallel to a direction X and direction Y in the drawings, the term "vertical direction" generally means a direction parallel to a direction Z and perpendicular to the horizontal direction in the drawings, and the direction X, the direction Y and the direction Z are perpendicular to each other. In the description and following claims, the term "top view" generally means a viewing result viewing along the vertical direction. In the description and following claims, the term "side view" means a viewing result viewing along the horizontal direction, and the term "cross-sectional view" generally means a viewing result viewing a structure cutting along the vertical direction along the horizontal direction.

In the description and following claims, it should be noted that the term "overlap" means that two elements overlap along the direction Z, and the term "overlap" can be "partially overlap" or "completely overlap" in unspecified circumstances.

The terms "about", "approximately", "substantially", "equal" or "same" generally mean within ±20% of a given value or range, or mean within ±10%, ±5%, ±3%, ±2%, ±1%, or ±0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, the image display device may include a display device, a lighting device, an antenna device, a sensing device, a tiled device or a combination thereof, but not limited thereto. The display device may be a non-self-luminous type display device or a self-luminous type display device based on requirement(s), and the display device may be a color display device or a monochrome display device based on requirement(s). The antenna device may be a liquid-crystal-type antenna device or a non-liquid-crystal-type antenna device, the sensing device may be a device for sensing capacitance, light, thermal or ultrasonic, and the tiled device may be a tiled display device or a tiled antenna device, but not limited thereto. Electronic components in the image display device may include passive component(s) and active component(s), such as capacitor(s), resistor(s), inductor(s), diode(s), transistor(s), but not limited thereto. The diode may include a light emitting diode (LED) or a photodiode. The light emitting diode may include an organic light emitting diode (OLED), a mini LED, a micro LED or a quantum dot LED, but not limited thereto. The transistor may include a top gate thin film transistor, a bottom gate thin film transistor or a dual gate thin film transistor, but not limited thereto. The image display device may include fluorescence material, phosphorescence material, quantum dot (QD) material or other suitable material based on requirement(s), but not limited thereto. The image display device may have a peripheral system (such as a driving system, a control system, a light system, etc.) for supporting the device (s) and the component(s) in the image display device.

Figure 2:
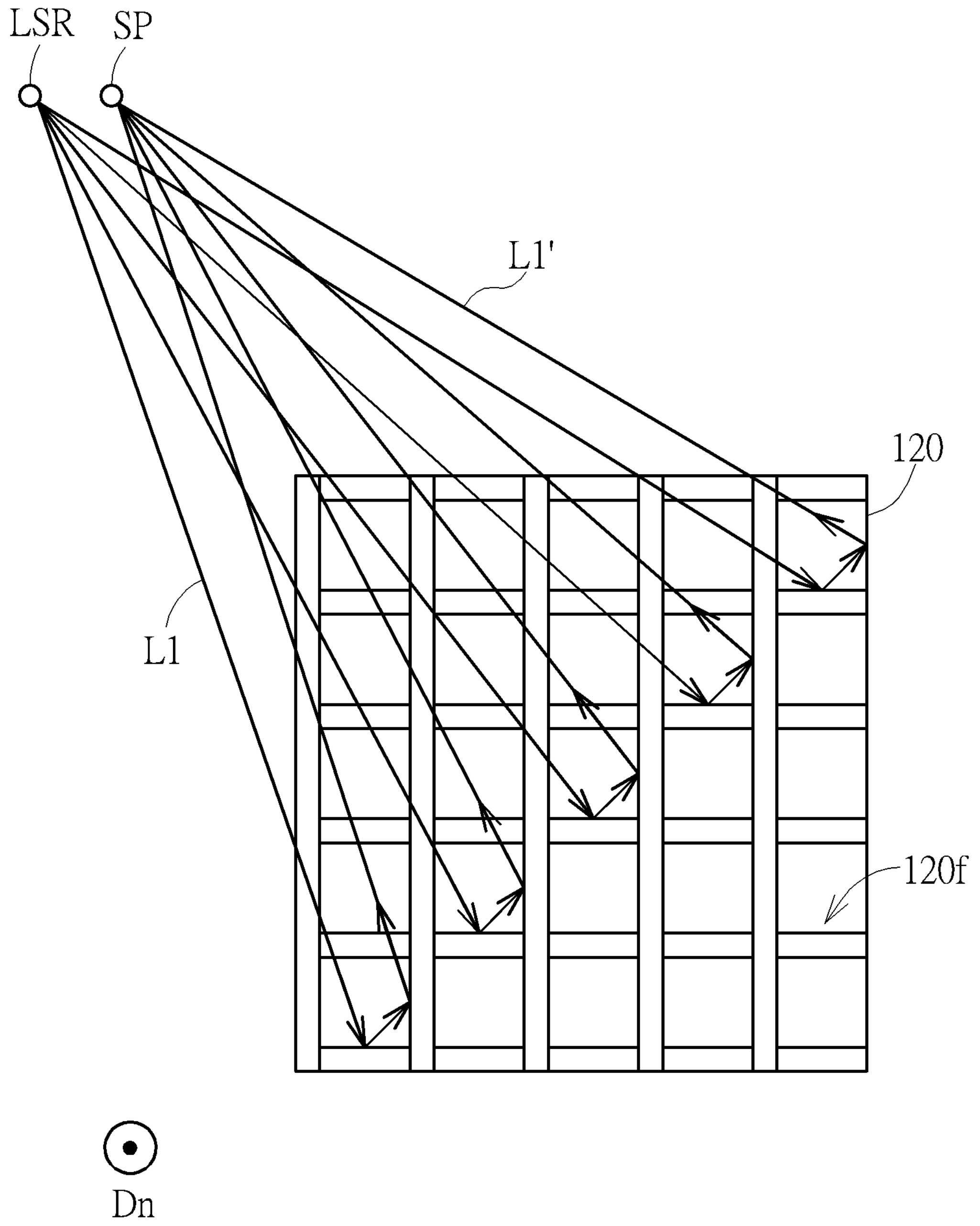
FIG. 2 and FIG. 3 are schematic diagrams showing light related to an optical modulator of an image display device according to a first embodiment of the present disclosure.
Figure 3:
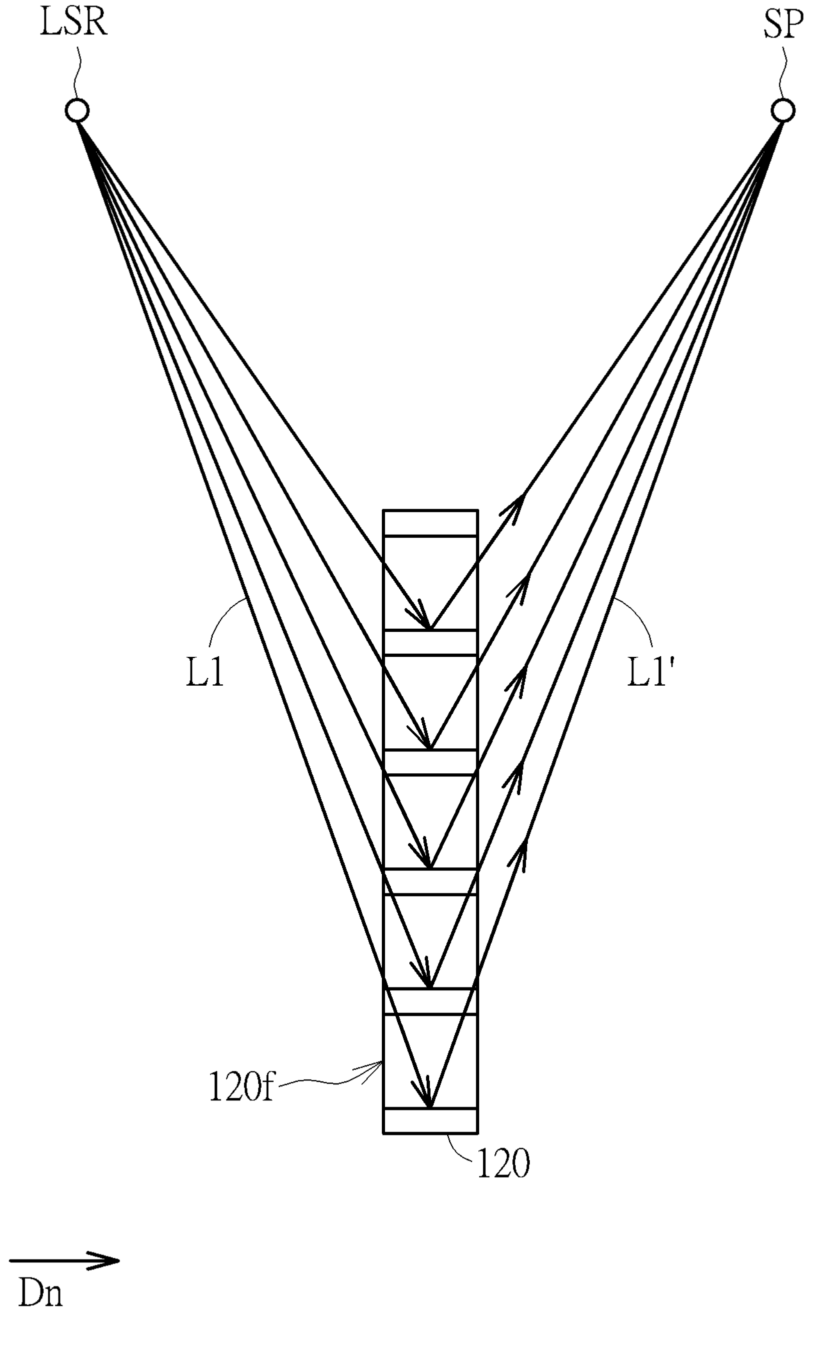
Figure 4:
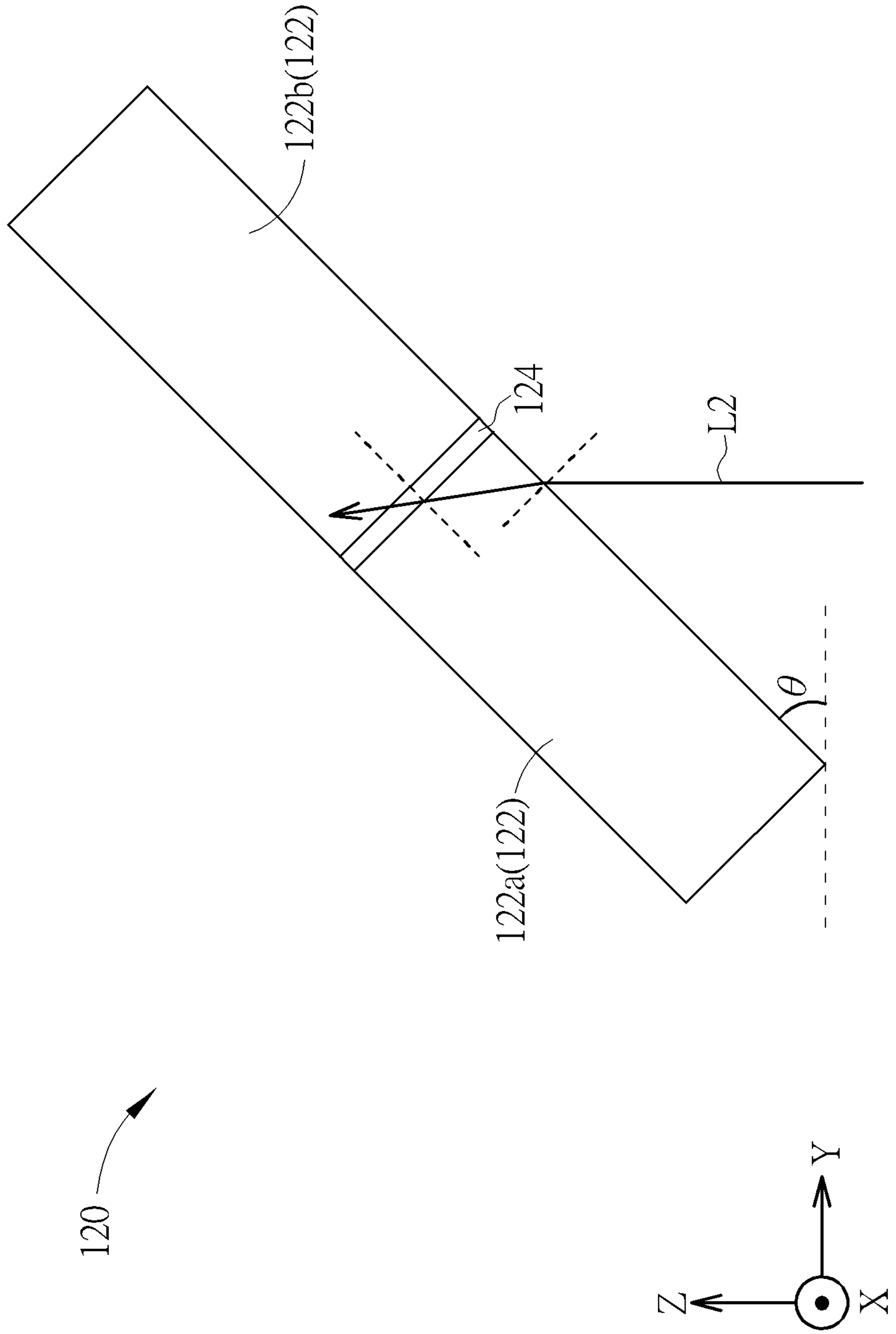
FIG. 4 is a schematic diagram showing a cross-sectional view of an example of an optical modulator of an image display device according to a first embodiment of the present disclosure.
Figure 5:
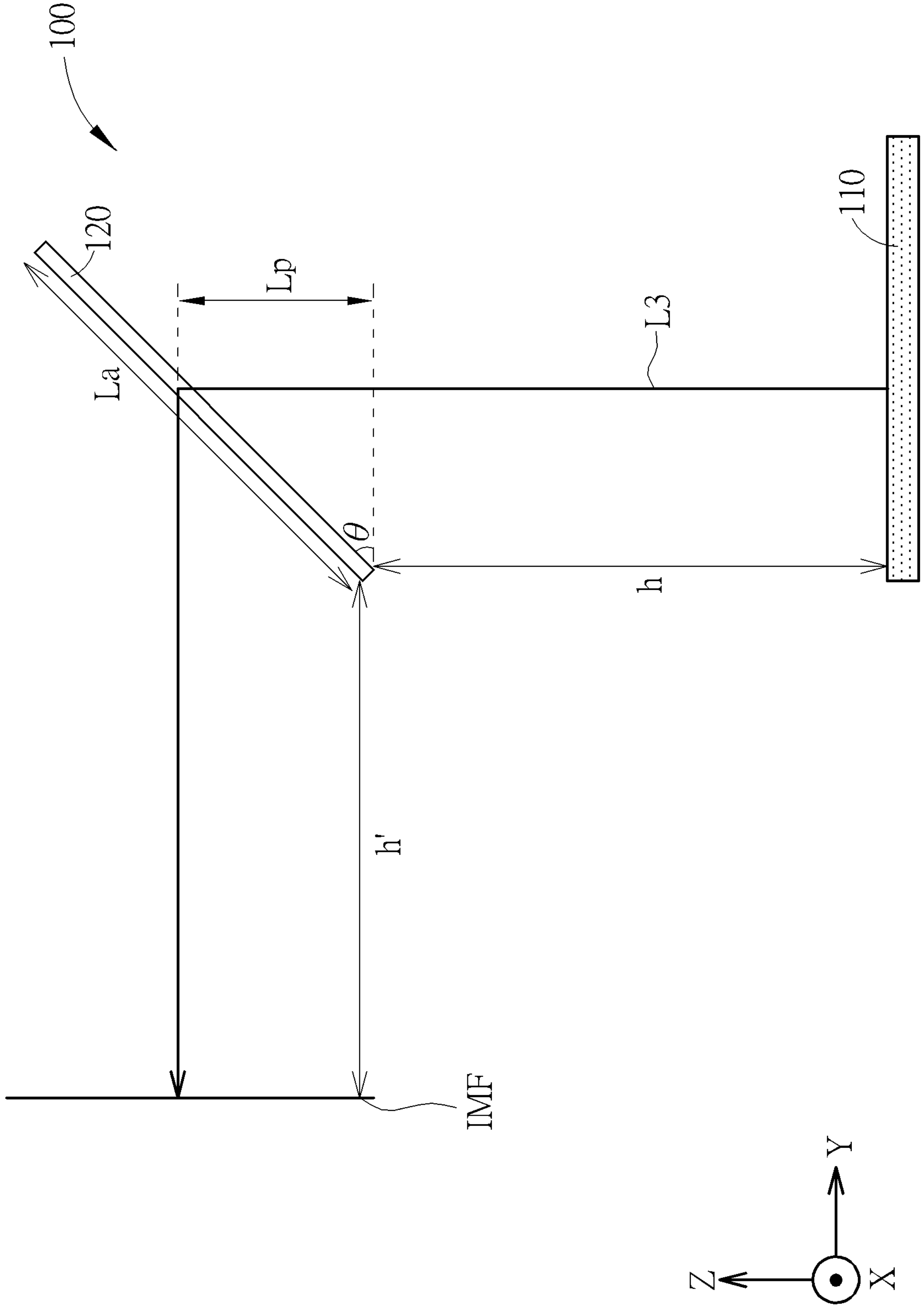
FIG. 5 is a schematic diagram showing a side view of an image display device according to a first embodiment of the present disclosure.

Referring to FIG. 1 to FIG. 5, FIG. 1 is a schematic diagram showing an image display device according to a first embodiment of the present disclosure, FIG. 2 and FIG. 3 are schematic diagrams showing light related to an optical modulator of an image display device according to a first embodiment of the present disclosure, FIG. 4 is a schematic diagram showing a cross-sectional view of an example of an optical modulator of an image display device according to a first embodiment of the present disclosure, and FIG. 5 is a schematic diagram showing a side view of an image display device according to a first embodiment of the present disclosure. In the present disclosure, the image display device 100 may image a projected image on an image-plane IMF outside the image display device 100, wherein the image-plane IMF may be between the image display device 100 and a viewer UR, such that the viewer UR may see the floating projected image outside the image display device 100, so as to achieve the visual effect of the floating image. As shown in FIG. 1, in the first direction (e.g., the direction Y), the image-plane IMF is between the image display device 100 and the viewer UR, but not limited thereto.

As shown in FIG. 1, the image display device 100 may include a display device 110, wherein the display device 110 is configured to display a display image in its display region. The display device 110 may be a non-self-luminous type display device or a self-luminous type display device based on requirement(s), and the display device 110 may include corresponding components and corresponding structures based on its type. For example, when the display device 110 is the non-self-luminous type display device, the display device 110 may include a substrate, a circuit component layer, a display medium layer, a backlight module and other suitable component, wherein the backlight module may have a backlight source configured to provide backlight, the display medium layer may include any suitable display medium material (e.g., liquid crystal molecules), and the circuit component layer may include any suitable electronic component (e.g., scan lines, data lines, transistors, pixel electrodes and/or common electrodes) configured to control the status of the display medium material in the display medium layer to control the light intensity of each region, but not limited thereto. For example, when the display device 110 is the self-luminous type display device, the display device 110 may include a substrate, a circuit component layer and other suitable component, wherein the circuit component layer may include any suitable light-emitting component (e.g., light emitting diodes) and any suitable electronic component (e.g., scan lines, data lines and/or transistors) configured to control the light-emitting component, and the light-emitting component generates the light with the corresponding light intensity based on the signal(s), but not limited thereto.

In the display device 110, the substrate may be a rigid board or a flexible board. Based on the type of the substrate, the material of the substrate may include glass, quartz, ceramic, sapphire, polymer (e.g., polyimide (PI), polyethylene terephthalate (PET), etc.), other suitable materials or a combination thereof. In the display device 110, the circuit component layer may include at least one conductive layer, at least one insulating layer, at least one semiconductor layer, other suitable layer (s) or a combination thereof, so as to form the electronic components in the circuit component layer. The material of the conductive layer may include metal, transparent conductive material (such as indium tin oxide (ITO), indium zinc oxide (IZO), etc.), other suitable conductive material (s) or a combination thereof, the material of the insulating layer may include such as silicon oxide ($SiO_x$), silicon nitride ($SiN_y$), silicon oxynitride ($SiO_xN_y$), organic insulating material (e.g., photosensitive resin), other suitable insulating material(s) or a combination thereof, and the material of the semiconductor layer may include such as poly-silicon, amorphous silicon, metal-oxide semiconductor, other suitable semiconductor material(s) or a combination thereof, but not limited thereto.

The display device 110 may be a color display device or a monochrome display device based on requirement(s), and the display device 110 may include corresponding components and corresponding structures based on its type. For instance, when the display device 110 is the color display device, the light-emitting elements of the display device 110 (e.g., the backlight module of the non-self-luminous type display device or the light-emitting components of the self-luminous type display device) may directly generate lights with different colors, and a corresponding color image may be generated through the control of the signals (e.g., gray level signals), but not limited thereto. For instance, when the display device 110 is the color display device, the light-emitting elements of the display device 110 (e.g., the backlight module of the non-self-luminous type display device or the light-emitting components of the self-luminous type display device) may generate lights with the same color, the display device 110 may include a light conversion layer disposed on the light-emitting elements, and the light conversion layer may convert (or filter) the light emitted from the light emitting elements (e.g., white light, blue light, etc.) into another light with another color, wherein the light conversion layer may include color filter, quantum dots material, fluorescence material, phosphorescence material, other suitable material(s) or a combination thereof, but not limited thereto. When the display device 110 is the monochrome display device, the light-emitting elements of the display device 110 may generate lights with the same color, and the display device 110 may optionally include a light conversion layer, but not limited thereto.

The display region of the display device 110 may include a plurality of pixels, and the pixel may include at least one sub-pixel. In some embodiments, if the display device 110 is the color display device, one pixel may include a plurality of sub-pixels for instance (e.g., a green sub-pixel, a red sub-pixel and a blue sub-pixel), but not limited thereto. The number and color of the sub-pixel(s) included in the pixel may be adjusted based on requirement(s). In some embodiments, if the display device 110 is the monochrome display device, one pixel may include one sub-pixel for instance, but not limited thereto.

The display device 110 may have a peripheral region disposed on at least one outer side of the display region, and electronic component (s) configured to assist the display region (e.g., a gate driving circuit, a source driving circuit, integrated circuit, etc.) may be disposed in the peripheral region, but not limited thereto.

In the present disclosure, the display device 110 may be disposed at a position based on requirement(s). In some embodiments (as shown in FIG. 1), a light emitting surface of the display device 110 may be parallel to the horizontal plane (i.e., the light emitting surface may be parallel to the direction X and the direction Y), such that a first normal direction of the display device 110 (e.g., a normal direction of the light emitting surface and/or a normal direction of the substrate of the display device 110) may be parallel to the direction Z, but not limited thereto. For instance, the display device 110 may be placed flat on the ground, such that the light emitting surface of the display device 110 may be parallel to the direction X and the direction Y, and the first normal direction of the display device 110 may be parallel to the direction Z, but not limited thereto.

Furthermore, a shape of the display device 110 may be a polygon (e.g., a rectangle), a shape having a curved edge (e.g., a circle, an oval) or other suitable shape. For example (as shown in FIG. 1), the shape of the display device 110 may be a rectangle, but not limited thereto. For example, in FIG. 1, the display device 110 may have a side edge **110*a* parallel to the first direction (e.g., the direction Y) and a side edge 110*b* parallel to a second direction (e.g., the direction X), wherein the first direction, the second direction and the first normal direction of the display device 110** are not parallel to each other (e.g., they may be perpendicular to each other).

As shown in FIG. 1, the image display device 100 may include an optical modulator 120, wherein the optical modulator 120 is configured to properly adjust the light entering the optical modulator 120 before the light exits the optical modulator 120. In the present disclosure, as shown in FIG. 2 and FIG. 3 (FIG. 2 shows a viewing result viewing the optical modulator 120 along a second normal direction Dn of the optical modulator 120, and FIG. 3 shows a viewing result viewing the optical modulator 120 along a direction perpendicular to the second normal direction Dn of the optical modulator 120), when the light L1 generated by a light source LSR enters the optical modulator 120, a light component of the light L1 parallel to the second normal direction Dn of the optical modulator 120 would pass through the optical modulator 120, and a light component of the light L1 perpendicular to the second normal direction Dn of the optical modulator 120 would be reflected (e.g., at least two times reflection) to form another light component opposite (or approximately opposite) to the original component. For instance, in the 3D Cartesian coordinate system (x, y, z), assuming that the coordinate of the light source LSR is (3, 4, −5) and the optical modulator 120 is a plane of z=0, after the lights L1 generated by the light source LSR enters the optical modulator 120 and is adjusted by the optical modulator 120, a coordinate of a light gathering point SP of lights L1' emitted from the optical modulator 120 is (3, 4, 5). In some embodiments, the optical modulator 120 may be a multiple-reflection optical structure (e.g., a retro reflector), but not limited thereto. Note that, FIG. 2 shows the light source LSR and the light gathering point SP in different positions for the purpose of distinction, but the light source LSR and the light gathering point SP would overlap in the second normal direction Dn of the optical modulator 120 actually.

As shown in FIG. 1, the optical modulator 120 is disposed on the display device 110. When the lights generated by the display device 110 enter the optical modulator 120, the optical modulator 120 properly and correspondingly adjusts these lights, such that the lights emitted from the optical modulator 120 would image the projected image on the image-plane IMF, so as to make the viewer UR see the projected image on the image-plane IMF. Namely, the display image displayed by the display device 110 is projected on the image-plane IMF by the optical modulator 120, so as to be the projected image on the image-plane IMF. For instance, in FIG. 1, the optical modulator 120 may serve as a symmetry plane between the image-plane IMF and the light emitting surface of the display device 110, but not limited thereto.

In FIG. 1, FIG. 4 and FIG. 5, an included angle θ is between the optical modulator 120 and the display device 110, and the range of the included angle θ may be designed based on requirement(s). In some embodiments, the included angle θ may range from 20 degrees to 70 degrees (i.e., $20° \leq \theta \leq 70°$), so as to make the image-plane IMF between the optical modulator 120 and the viewer UR in the direction Y, and to make a ratio of the size (e.g., the height in the direction Z) of the projected image on the image-plane IMF seen by the viewer UR to the size (e.g., the height) of the corresponding image in the display image displayed by the display device 110 greater than or equal to 0.9 (or, greater than or equal to 0.9 and less than or equal to 1), but not limited thereto. For example, the included angle θ may be 45 degrees, such that the ratio of the size (e.g., the height in the direction Z) of the projected image on the image-plane IMF seen by the viewer UR to the size (e.g., the height) of the corresponding image in the display image displayed by the display device 110 may be equal to or similar to 1, but not limited thereto.

In the present disclosure, the structure in the optical modulator 120 may be designed based on requirement(s), and the structure in the optical modulator 120 may adjust the light entering the optical modulator 120, such that the light emitted from the optical modulator 120 meets the aforementioned effect. For instance, in FIG. 2 and FIG. 3, the optical modulator 120 may include a plurality of lattice structures 120*f*, but not limited thereto.

Optionally, the optical modulator 120 may include a plurality of sub optical modulators connected to each other, so as to enhance the size of the optical modulator 120. In some embodiments (as shown in FIG. 4), the optical modulator 120 may include a first sub optical modulator 122*a* and a second sub optical modulator 122*b*, and the second sub optical modulator 122*b* may be disposed adjacent to the first sub optical modulator 122*a*, wherein a connecting material 124 may exist between the first sub optical modulator 122*a* and the second sub optical modulator 122*b*, so as to make the first sub optical modulator 122*a* and the second sub optical modulator 122*b* connected to each other. In FIG. 4, the connecting material 124 may be disposed between a sidewall of the first sub optical modulator 122*a* and a sidewall of the second sub optical modulator 122*b*, such that the first sub optical modulator 122*a* and the second sub optical modulator 122*b* may be connected at two sidewalls, but not limited thereto. In some embodiments, the first sub optical modulator 122*a* and the second sub optical modulator 122*b* may be the same, but not limited thereto.

In the present disclosure, the material and the refractive index of the connecting material 124 may be designed based on requirement(s). In some embodiments, the connecting material 124 may include any suitable adhesive material, so as to adhere to the first sub optical modulator 122*a* and the second sub optical modulator 122*b*, but not limited thereto. In some embodiments, the connecting material 124 may include a first refractive index $n_f$, the first sub optical modulator 122*a* and/or the second sub optical modulator 122*b* may include a second refractive index $n_r$, and a difference between the first refractive index $n_f$ and the second refractive index $n_r$ and the ratio of the first refractive index $n_f$ to the second refractive index $n_r$ may be correspondingly designed, so as to reduce the adverse effect on the light (e.g., the light L2 shown in FIG. 4) entering the optical modulator 120. For example, in order to reduce the total internal reflection of the light (e.g., the light L2) at the connection between the first sub optical modulator 122*a* and the second sub optical modulator 122*b* (as shown in FIG. 4, the light would pass through the first sub optical modulator 122*a*, the connecting material 124 and the second sub optical modulator 122*b* at this connection), the first refractive index $n_f$ and the second refractive index $n_r$ need to satisfy a formula (1):

$$n_f > n_r \cdot \cos\left[\sin^{-1}\left(\frac{\sin\theta}{n_r}\right)\right].$$

For example, assuming the included angle θ is 45 degrees, the first refractive index $n_f$ and the second refractive index $n_r$ may satisfy $0.9n_r \le n_f \le 1.1n_r$ according to the formula (1), but not limited thereto.

As shown in FIG. 1 and FIG. 5, a first minimum distance h exists between the optical modulator 120 and the display device 110 in the first normal direction of the display device 110 (e.g., the direction Z), and the first minimum distance h may be designed based on requirement(s). In some embodiments (as shown in FIG. 5), in order to make the projected image of the image-plane IMF have the evident floating effect, the first minimum distance h may be greater than or equal to 10 cm for instance, but not limited thereto.

On the other hand, the first minimum distance h is related to the brightness of the projected image of the image-plane IMF, wherein the brightness of the projected image is decreased as the first minimum distance h is increased. In some embodiments, the brightness $B_1$ of the projected image of the image-plane IMF may be calculated by a formula (2):

$$B_i = B \times \alpha^{\frac{L}{100\,cm}} \times \eta,$$

wherein B is a center brightness of the display device 110, a is a light intensity distance maintenance rate of a light source of the display device 110, L is an average light path length of a light L3 from the display device 110 to the image-plane IMF, and η, is an optical efficiency of the optical modulator 120. According to FIG. 5, a second minimum distance h' may exist between the image-plane IMF and the optical modulator 120 (e.g., the second minimum distance h' may exist between the image-plane IMF and the optical modulator 120 in the direction Y), the optical modulator 120 may have a length La, and the length La may be $2\sqrt{2}$ times a length Lp shown in FIG. 5. Thus, the average light path length of the light L3 from the display device 110 to the image-plane IMF may be a sum of the first minimum distance h, the second minimum distance h' and two lengths Lp (i.e., L=h+h'+2Lp). In some embodiments, since the optical modulator 120 may serve as the symmetry plane between the image-plane IMF and the light emitting surface of the display device 110, the first minimum distance h may be the same as the second minimum distance h', but not limited thereto.

According to the formula (2), in the condition that the first minimum distance h is the same as the second minimum distance h', a formula (3):

$$h = \frac{1}{2}\left(\frac{\log\frac{B_i}{\eta \times B}}{\log\alpha} \times 100 - \frac{La}{\sqrt{2}}\right),$$

would be deduced from the formula (2). Thus, the first minimum distance h may be correspondingly adjusted according to the desired brightness $B_i$ of the projected image of the image-plane IMF, the center brightness B of the display device 110, the light intensity distance maintenance rate α of the light source of the display device 110, the optical efficiency η of the optical modulator 120 and the length La of the optical modulator 120. In some embodiments, the desired brightness $B_i$ of the projected image of the image-plane IMF may be greater than or equal to 300 nits, such that the first minimum distance h may be less than or equal to $$\frac{1}{2}\left(\frac{\log\frac{300}{\eta\times B}}{\log\alpha}\times 100-\frac{La}{\sqrt{2}}\right),$$

but not limited thereto. For instance, assuming that the center brightness B of the display device 110 is 1700 nits, the light intensity distance maintenance rate α of the light source of the display device 110 is 0.9, the optical efficiency η of the optical modulator 120 is 0.25, and the length La of the optical modulator 120 is 200 cm, if the first minimum distance h is 70 cm, the brightness $B_i$ of the projected image of the image-plane IMF is approximately 316 nits, but not limited thereto.

According to the above, the first minimum distance h may be greater than or equal to 10 cm and less than or equal to $$\frac{1}{2}\left(\frac{\log\frac{300}{\eta\times B}}{\log\alpha}\times 100-\frac{La}{\sqrt{2}}\right)\text{cm},$$

but not limited thereto.

The desired brightness $B_i$ of the projected image of the image-plane IMF, the center brightness B of the display device 110, the light intensity distance maintenance rate α of the light source of the display device 110 and the optical efficiency η of the optical modulator 120 may be measured by any suitable method. In some embodiments, the desired brightness $B_i$ of the projected image of the image-plane IMF, the center brightness B of the display device 110, the light intensity distance maintenance rate α of the light source of the display device 110 and the optical efficiency η of the optical modulator 120 may be measured in an appropriate manner by any brightness measuring equipment. For example, in the measurement of the light intensity distance maintenance rate α of the light source of the display device 110, the brightness of the display device 110 is measured by the brightness measuring equipment (e.g., a display measuring system (DMS) equipment), wherein a brightness measuring result $I_0$ is obtained by the brightness measuring equipment when a distance between the brightness measuring equipment and the display device 110 is 0 cm, a brightness measuring result $I_{100}$ is obtained by the brightness measuring equipment when a distance between the brightness measuring equipment and the display device 110 is 100 cm, and the light intensity distance maintenance rate α of the light source is $I_{100}/I_0$, but not limited thereto.

Moreover, as the collimating degree of the light generated by the display device 110 is increased, the light intensity distance maintenance rate α of the light source of the display device 110 is increased (i.e., α is close to 1). On the other hand, as the collimating degree of the light generated by the display device 110 is increased, the possibility of the viewer UR seeing the ghosting is decreased. In the present disclosure, the collimating degree may be determined by any suitable method. In the following, some methods of comparing the collimating degrees of the lights are provided.

In a method of comparing the collimating degrees of the lights according to an embodiment, the comparison of the collimating degrees of the lights would be determined by a ratio of the light intensity of the display device 110 in its first normal direction (e.g., the direction Z) to the light intensity in other direction. In detail, the display device 110 has a first light intensity in the first normal direction (e.g., the direction Z). When an angle between a direction and the first normal direction is greater than a first angle φ and less than or equal to 90 degrees (i.e., the first angle φ<this angle between this direction and the first normal direction≤90 degrees), a ratio of the light intensity of the display device 110 in this direction to the first light intensity may be less than a designed value, and this designed value may be adjusted based on requirement(s). For instance, this designed value may be less than 20%, 10%, 5% or other suitable value, but not limited thereto. In this case, the collimating degree of the light is increased as the first angle φ is decreased. In some embodiments, the first angle φ and the included angle θ may satisfy a formula (4):

$$\varphi=\cos^{-1}\left(\frac{\sin\theta}{\sqrt{1+\cos^2\theta}}\right),$$

and the first angle φ may be less than or equal to 55 degrees, so as to decrease the possibility of the viewer UR seeing the ghosting. For instance, if the included angle θ is 45 degrees, the first angle φ is approximately 54.74 degrees, but not limited thereto. The term "light intensity" means an integral value of a spectrum of the light source (e.g., the display light or the ambient light). In some embodiments, the light source may include visible light (e.g., the wavelength ranges from 380 nm to 780 nm) or ultraviolet light (e.g., the wavelength is less than 365 nm), but not limited thereto. That is to say, when the light source is the visible light, the light intensity is the integral value in the wavelength range of 380 nm to 780 nm in the spectrum.

The first angle φ may be measured by a suitable brightness measuring equipment (e.g., a spectroradiometer, a conometer, a DMS equipment or other suitable equipment). For instance, the light intensity of the light generated by the display device 110 in directions at various angles may be measured by the brightness measuring equipment (e.g., the measurement is performed in the condition that the display device 110 displays the greatest brightness), and the first angle φ is calculated according to ratios of the light intensity in these direction to the first light intensity, but not limited thereto. Note that, in the spherical coordinate system which has axes along the direction X, the direction Y and the direction Z, regarding to above directions at various angles, polar angles of these direction (i.e., angles between these direction and the direction Z) range from 0 degrees to 90 degrees (i.e., 0 degrees≤the polar angles≤90 degrees), and azimuthal angles of these direction (i.e., angles between components of these direction projected on XY-plane and the direction X) are greater than or equal to 0 degrees and less than 360 degrees (i.e., 0 degrees≤the azimuthal angles<360 degrees). Therefore, when the angle between a direction and the direction Z (i.e., the polar angle of this direction) is greater than the first angle φ and less than or equal to 90 degrees, the ratio of the light intensity in this direction to the first light intensity would be less than the designed value (e.g., 20%, 10%, 5% or other value) regardless of the azimuth of this direction.

In a method of comparing the collimating degrees of the lights according to another embodiment, the comparison of the collimating degrees of the lights would be determined by a ratio of a sum of light intensities of the display device 110 in specific angle range to a total light intensity of the display device 110. In detail, the collimating degree of the lights is increased as a ratio of a sum of light intensities of the display device 110 in specific angle range (e.g., less than or equal to 10°) respective to the first normal direction (e.g., the direction Z) to a total light intensity of the display device 110 is increased, but not limited thereto. Note that the light intensity may be measured by a suitable brightness measuring equipment (e.g., a spectroradiometer, a conometer, a DMS equipment or other suitable equipment).

In the present disclosure, any suitable method may be used to increase the collimating degree of the lights generated by the display device 110. For instance, the display device 110 (e.g., the non-self-luminous type display device) may include a collimated backlight module, so as to enhance the collimating degree of the lights generated by the display device 110, but not limited thereto.

Figure 6:
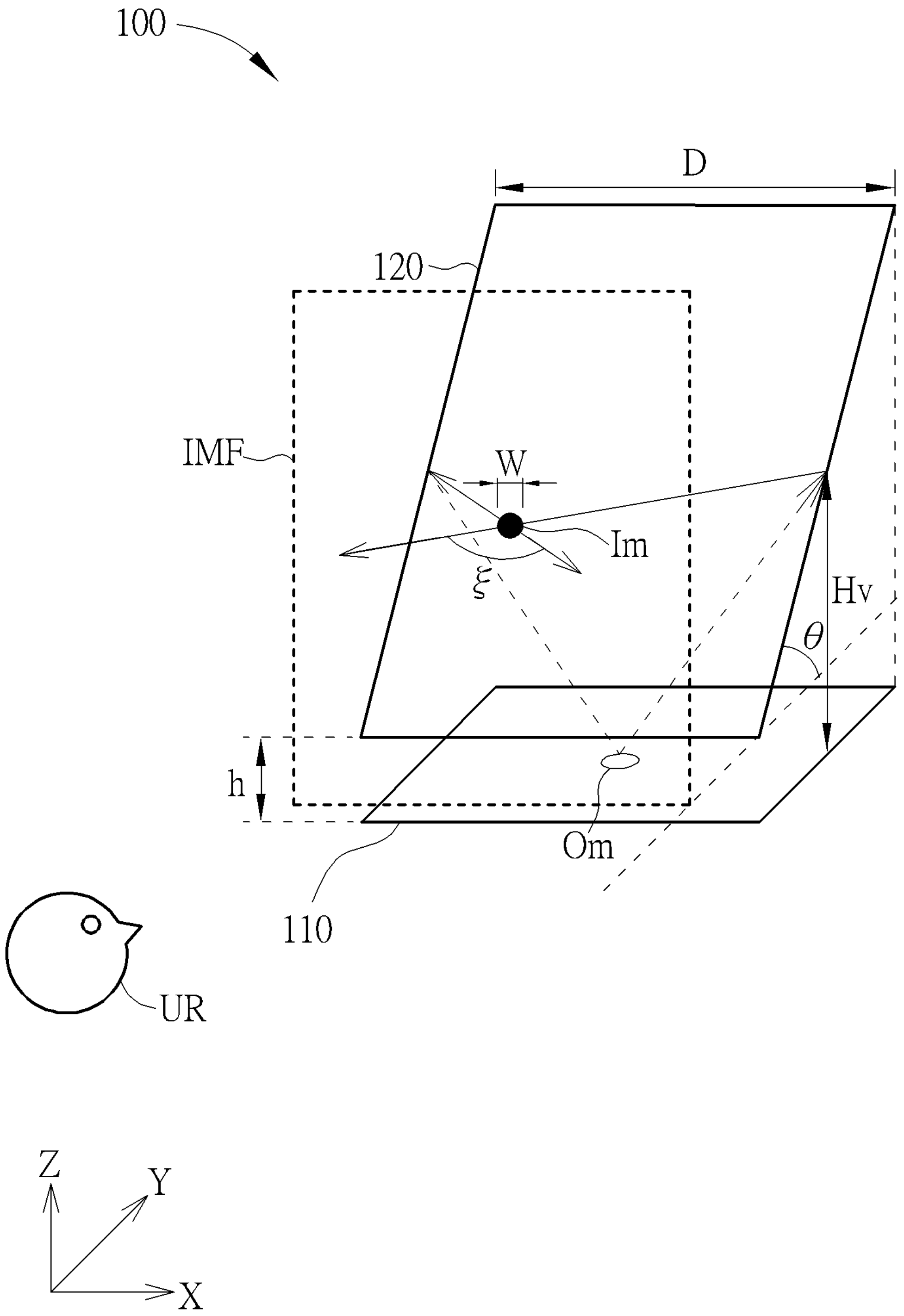
FIG. 6 is a schematic diagram showing a viewing angle design of an image display device according to a first embodiment of the present disclosure.

In the present disclosure, a good viewing position for the viewer UR to watch the projected image may be calculated according to the design of the optical modulator 120 and the size of the projected image of the image-plane IMF. Referring to FIG. 6, FIG. 6 is a schematic diagram showing a viewing angle design of the image display device. As shown in FIG. 6, the good viewing position is related to a viewable angle ξ of the projected image Im (the projected image Im is projected from an image Om generated by the display device 110), and the viewable angle ξ is an angle between a sight line of the viewer UR and the normal direction of the image-plane IMF (e.g., the normal direction of the image-plane IMF shown in FIG. 6 is the direction Y). In some embodiments, the side edge of the optical modulator 120 parallel to the direction X has a size D, the projected image Im of the image-plane IMF has a size W in the direction X, and an average distance Hv exists between the display device 110 and the optical modulator 120 in the first normal direction of the display device 110 (e.g., the direction Z). In the horizontal viewable angle ξ parallel to the horizontal plane (the horizontal plane is parallel to the direction X and the direction Y), the viewable angle ξ may satisfy a formula (5):

$$\xi \leq \tan^{-1}\left(\frac{D-W}{2Hv}\right).$$

For instance, assuming that the size D is 100 cm and the average distance Hv is 50 cm, if the size W is approximately 0 cm (e.g., the projected image is a dot), the viewable angle ξ ay be less than or equal to 45 degrees according to the formula (5), but not limited thereto. Regarding to the average distance Hv in the first normal direction of the display device 110 (e.g., the direction Z), the average distance Hv may be a distance between a midpoint of a long side edge of the optical modulator 120 and the display device 110 in the direction Z, but not limited thereto.

Optionally, in FIG. 1, the image display device 100 may include at least one reference object 130, so as to serve as a reference for the viewer UR to judge the distance between himself and the projected image of the image-plane IMF, thereby enhancing the viewing quality (e.g., the distance related to the projected image) of the viewer UR and/or the visual effect of the projected image watched by the viewer UR. In the present disclosure, the number of the reference object(s) 130 may be designed based on requirement(s), and the reference objects 130 may be the same or different based on requirement(s).

As shown in FIG. 1, the image display device 100 may include a first reference object 132 close to the image-plane IMF in the first direction (e.g., the direction Y), wherein a distance between the first reference object 132 and the image-plane IMF in the first direction (e.g., the direction Y) may be designed based on requirement(s). In some embodiments, the distance between the first reference object 132 and the image-plane IMF in the first direction (e.g., the direction Y) may be related to a depth of field (DOF) of human eye. For example, the depth of field of the human eye is approximately ±50 cm when the human eye watches an object at a distance ranging from 1 meter to 10 meters, and therefore, the distance between the first reference object 132 and the image-plane IMF in the first direction (e.g., the direction Y) may be less than or equal to 50 cm, such that the viewer UR may watch the first reference object 132 clearly while clearly watching the projected image of the image-plane IMF, but not limited thereto.

As shown in FIG. 1, the image display device 100 may include a second reference object 134, wherein the second reference object 134 may be disposed adjacent to the side edge 110*a* of the display device 110 parallel to the first direction (e.g., the direction Y). In FIG. 1, the second reference object 134 may be disposed on a side of the display device 110 in the second direction (e.g., the direction X), but not limited thereto. For instance, the second reference object 134 may be aligned with a midpoint of the side edge 110*a* of the display device 110 parallel to the first direction (e.g., the direction Y) in the second direction (e.g., the direction X), but not limited thereto.

In the present disclosure, a distance between the first reference object 132 and the second reference object 134 may be designed based on requirement(s). In some embodiments, a distance D12 between the first reference object 132 and the second reference object 134 in the first direction (e.g., the direction Y) may be related to the depth of field of the human eye. For example, the distance D12 between the second reference object 134 and the first reference object 132 in the first direction may be greater than 50 cm, such that the viewer UR may watch the second reference object 134 that is far and blurred while clearly watching the projected image of the image-plane IMF (i.e., the second reference object 134 is further than the projected image), but not limited thereto. For example, as shown in FIG. 1 and FIG. 5, the first minimum distance h exists between the optical modulator 120 and the display device 110 in the first normal direction (e.g., the direction Z) of the display device 110, and the distance D12 between the first reference object 132 and the second reference object 134 in the first direction (e.g., the direction Y) may be h+50 cm, but not limited thereto. For instance, a distance between the second reference object 134 and the image-plane IMF in the first direction (e.g., the direction Y) may be greater than 50 cm, such that the viewer UR may watch the second reference object 134 that is far and blurred while clearly watching the projected image of the image-plane IMF (i.e., the second reference object 134 is further than the projected image), but not limited thereto.

As shown in FIG. 1, the image display device 100 may include a third reference object 136, the first reference object 132 may be disposed between the display device 110 and the third reference object 136 in the first direction (e.g., the direction Y). In FIG. 1, the first reference object 132 may be disposed between the second reference object 134 and the third reference object 136 in the first direction (e.g., the direction Y), but not limited thereto. In the present disclosure, a distance between the first reference object 132 and the third reference object 136 may be designed based on requirement(s). In some embodiments, a distance D13 between the first reference object 132 and the third reference object 136 in the first direction (e.g., the direction Y) may be related to the depth of field of the human eye. For example, the distance D13 between the third reference object 136 and the first reference object 132 in the first direction (e.g., the direction Y) may be greater than 50 cm, such that the viewer UR may watch the third reference object 136 that is close and blurred while clearly watching the projected image of the image-plane IMF (i.e., the third reference object 136 is closer than the projected image), but not limited thereto. For instance, a distance between the third reference object 136 and the image-plane IMF in the first direction (e.g., the direction Y) may be greater than 50 cm, such that the viewer UR may watch the third reference object 136 that is close and blurred while clearly watching the projected image of the image-plane IMF (i.e., the third reference object 136 is closer than the projected image), but not limited thereto.

In the present disclosure, the image display device 100 may further include other suitable component based on requirement(s). In some embodiments, the image display device 100 may include an adjusting component (the adjusting component would be referred to FIG. 7) configured to control the first minimum distance h existing between the optical modulator 120 and the display device 110 in the first normal direction (e.g., the direction Z) and/or the included angle θ between the optical modulator 120 and the display device 110, so as to adjust the position of the image-plane IMF and/or the projected image of the image-plane IMF. For example, the adjusting component may adjust the optical modulator 120 and/or the display device 110, so as to adjust the first minimum distance h and the included angle θ.

According to the above design of the image display device 100, the viewing quality of the viewer UR, the quality of the projected image watched by the viewer UR and/or the visual effect of the projected image watched by the viewer UR may be enhanced.

The image display device of the present disclosure is not limited to the above embodiments. Further embodiments of the present disclosure are described below. For ease of comparison, same components will be labeled with the same symbol in the following. The following descriptions relate the differences between each of the embodiments, and repeated parts will not be redundantly described.

Figure 7:
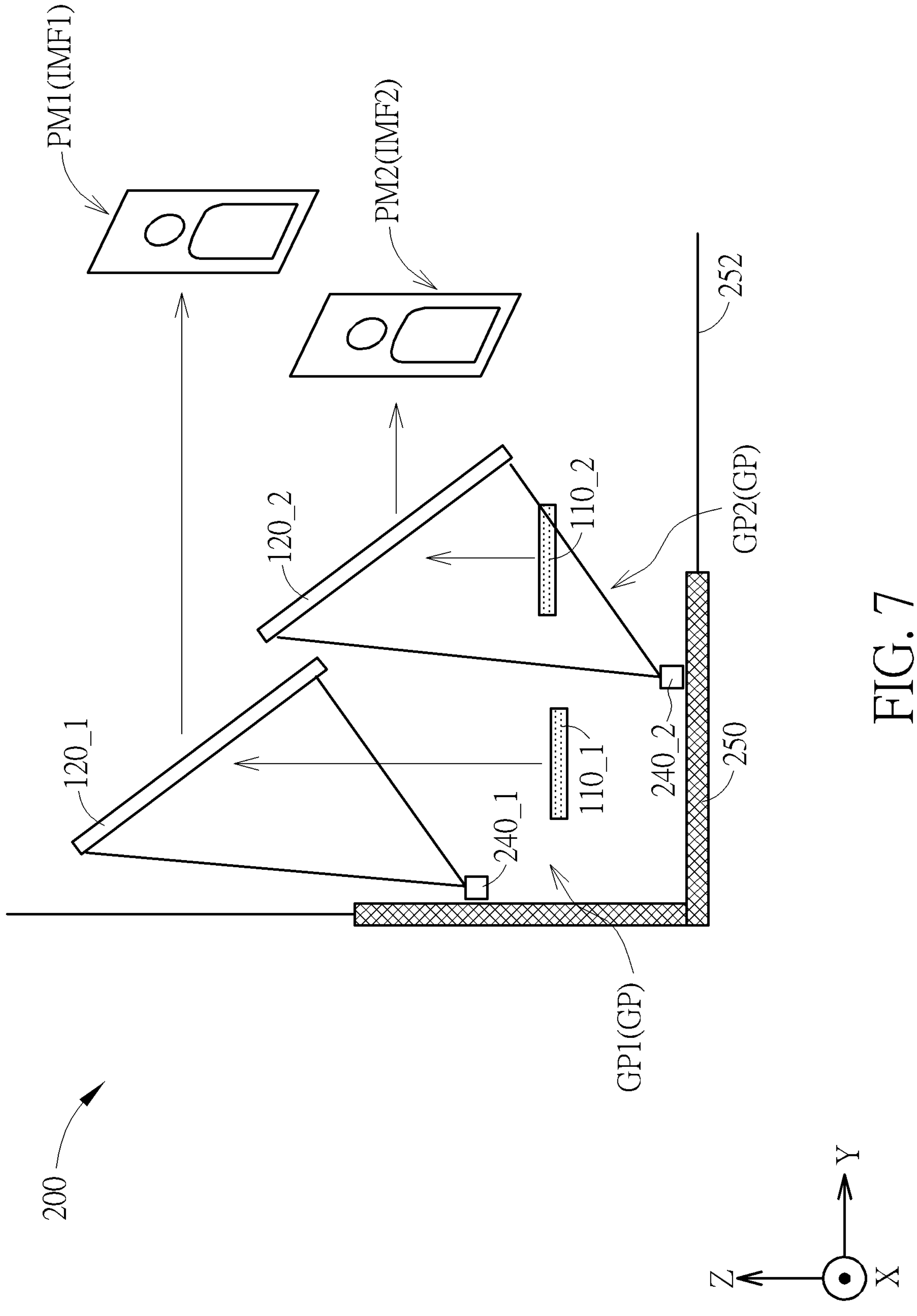
FIG. 7 is a schematic diagram showing an image display device in a using status according to a second embodiment of the present disclosure.
Figure 8:
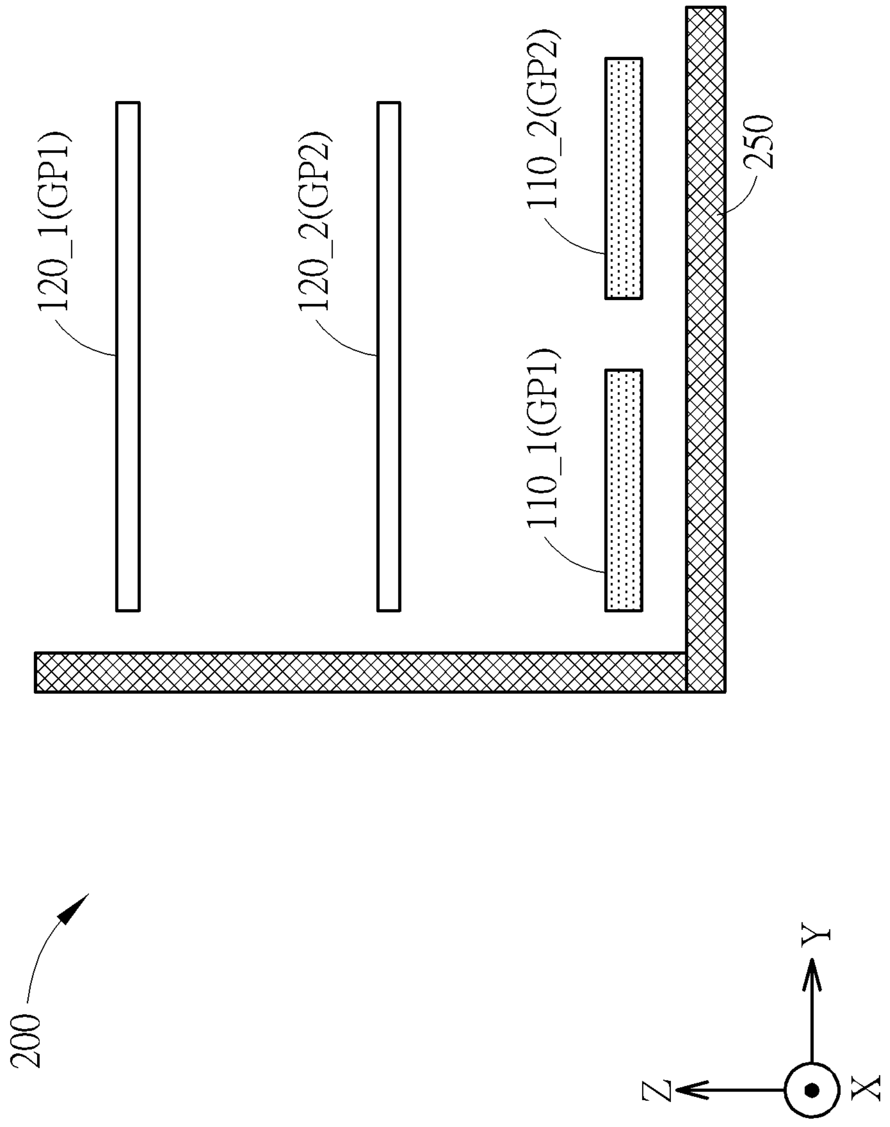
FIG. 8 is a schematic diagram showing an image display device in an accommodating status according to a second embodiment of the present disclosure.

Referring to FIG. 7 and FIG. 8, FIG. 7 is a schematic diagram showing an image display device in a using status according to a second embodiment of the present disclosure, and FIG. 8 is a schematic diagram showing an image display device in an accommodating status according to a second embodiment of the present disclosure. As shown in FIG. 7 and FIG. 8, the image display device 200 of this embodiment may include a plurality of image display groups GP configured to generate an image on their image-plane IMF individually, wherein the number of the image display groups GP may be designed based on requirement(s). In FIG. 7 and FIG. 8, the image display device 200 may include a first image display group GP1 configured to generate the first projected image PM1 and a second image display group GP2 configured to generate the second projected image PM2, wherein the first image display group GP1 may include a display device 110_1, an optical modulator 120_1 disposed on the display device 110_1 and an adjusting component 240_1, the second image display group GP2 may include a display device 110_2, an optical modulator 120_2 disposed on the display device 110_2 and an adjusting component 240_2. For instance, in FIG. 7, the adjusting component 240_1 is configured to control the position and the tilted angle of the optical modulator 120_1, so as to adjust the distance (e.g., the first minimum distance h) and the included angle θ between the display device 110_1 and the optical modulator 120_1 in the first image display group GP1, thereby adjusting the position of the first image-plane IMF1 of the first image display group GP1 and/or the first projected image PM1 of the first image-plane IMF1; the adjusting component 240_2 is configured to control the position and the tilted angle of the optical modulator 120_2, so as to adjust the distance (e.g., the first minimum distance h) and the included angle θ between the display device 110_2 and the optical modulator 120_2 in the second image display group GP2, thereby adjusting the position of the second image-plane IMF2 of the second image display group GP2 and/or the second projected image PM2 of the second image-plane IMF2, but not limited thereto. For example, the first image display group GP1 may further include another adjusting component (not shown in figures) configured to adjust the position of the display device 110_1, and the second image display group GP2 may further include another adjusting component (not shown in figures) configured to adjust the position of the display device 110_2, but not limited thereto.

As shown in FIG. 7, the first image display group GP1 and the second image display group GP2 may individually generate the first projected image PM1 and the second projected image PM2 at suitable positions based on requirement(s). For example, the first image-plane IMF1 of the first image display group GP1 and the second image-plane IMF2 of the second image display group GP2 may be coplanar or non-coplanar (e.g., the first image-plane IMF1 and the second image-plane IMF2 shown in FIG. 7 are non-coplanar). In some embodiments, the first image display group GP1 may adjust the optical modulator 120_1 and/or the display device 110_1 through the adjusting component (e.g., the adjusting component 240_1) while displaying the first projected image PM1, so as to adjust the first image-plane IMF1 and/or the first projected image PM1; the second image display group GP2 may adjust the optical modulator 120_2 and/or the display device 110_2 through the adjusting component (e.g., the adjusting component 240_2) while displaying the second projected image PM2, so as to adjust the second image-plane IMF2 and/or the second projected image PM2. Accordingly, the visual effect of the projected images may be enhanced (e.g., 3D interaction between the first projected image PM1 and the second projected image PM2 may be performed).

As shown in FIG. 7 and FIG. 8, the image display device 200 may further include an outer shell 250 configured to accommodate the image display groups GP. Optionally, as shown in FIG. 7, the outer shell 250 may also be used to assist the image display device 200 to display the projected image. For example, the outer shell 250 may serve as a base of the image display groups GP, but not limited thereto. As shown in FIG. 7, the image display device 200 may further include an extending component 252, wherein the extending component 252 may be used as an extension of the outer shell 250 to increase the length of the base when the image display device 200 is in an using status. For instance, the extending component 252 may be a telescopic mechanism in the outer shell 250, but not limited thereto.

In the present disclosure, the image display device 200 may be stowed to become an accommodating status based on requirement (s), thereby saving the space of the image display device 200. Note that the accommodating status shown in FIG. 8 is an example, and the accommodating status of the image display device 200 is not limited thereto.

Figure 9:
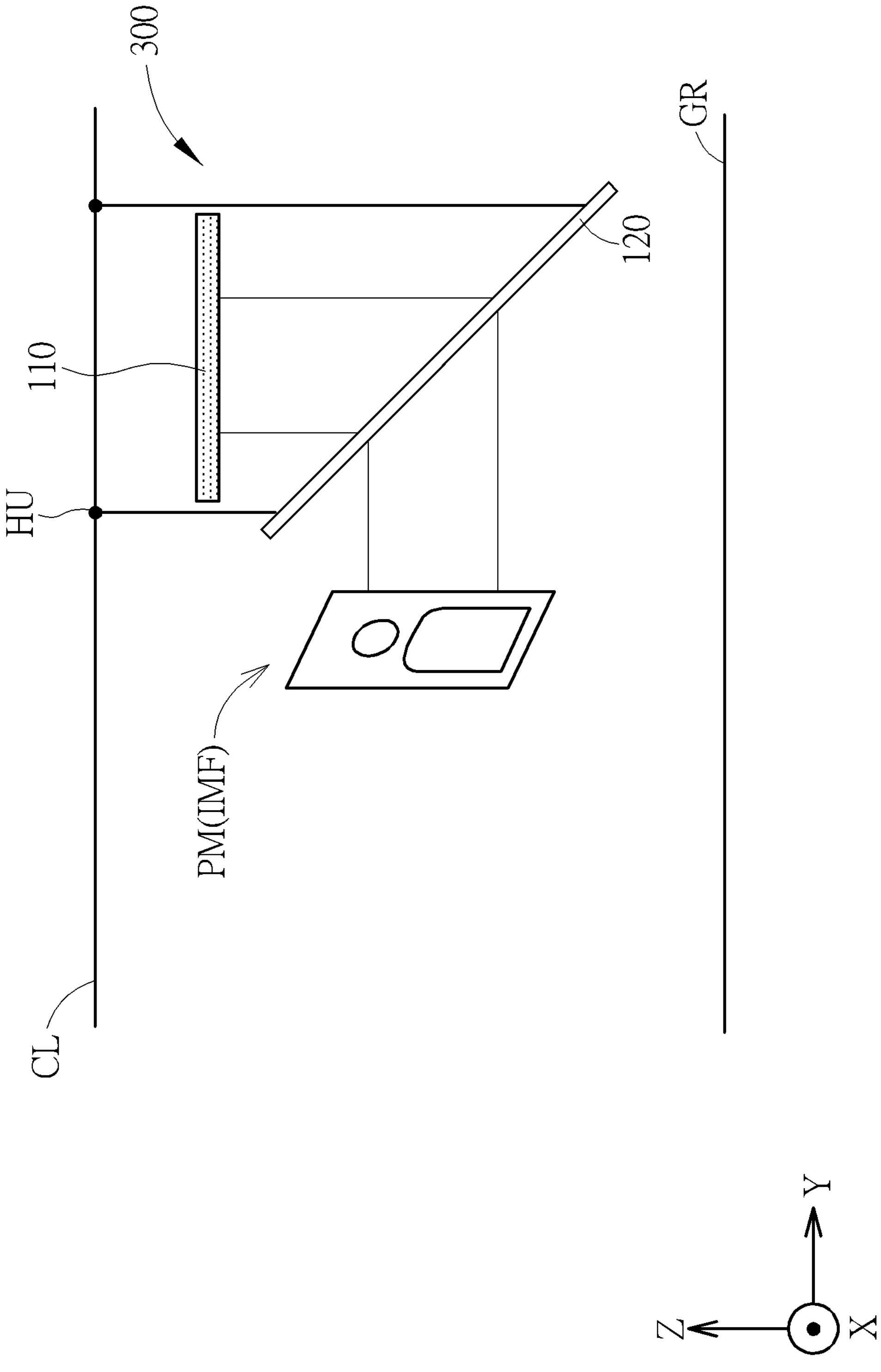
FIG. 9 is a schematic diagram showing a side view of an image display device according to a third embodiment of the present disclosure.

Referring to FIG. 9, FIG. 9 is a schematic diagram showing a side view of an image display device according to a third embodiment of the present disclosure. As shown in FIG. 9, the image display device 300 of this embodiment has a suspending design, such that the optical modulator 120 is between the display device 110 and the ground GR (i.e., the optical modulator 120 is closer to the ground GR than the display device 110). For instance, the display device 110 is closer to a ceiling CL and/or a suspending position HU than the optical modulator 120. Thus, the image display device 300 of this embodiment may reduce its using space on the ground GR or prevent itself from occupying the space on the ground GR, such that the probability of the image display device 300 hindering the movement of the viewer UR is reduced.

In the first normal direction (e.g., the direction Z) of the display device 110, a part of the projected image PM closer to the display device 110 is clearer than a part of the projected image PM farther away from the display device 110. For example, in the image display device which the display device 110 is closer to the ceiling CL and/or the suspending position HU than the optical modulator 120 (e.g., the image display device 300 shown in FIG. 9), if the projected image PM is a standing full-body human, the clarity of the head would be higher than that the clarity of the feet (the head is closer to the display device 110 than feet). For example, in the image display device which the display device 110 is closer to the ground GR than the optical modulator 120 (e.g., the image display device 100 shown in FIG. 1), if the projected image PM is a standing full-body human, the clarity of the feet would be higher than that the clarity of the head (the feet is closer to the display device 110 than head). Thus, through the design of the image display device, the more important part of the projected image PM would be closer to the display device 110, thereby increasing its clarity.

In summary, according to the design of the image display device of the present disclosure, the viewing quality of the viewer, the quality of the projected image watched by the viewer and/or the visual effect of the projected image watched by the viewer may be enhanced.

Although the embodiments and their advantages of the present disclosure have been described as above, it should be understood that any person having ordinary skill in the art can make changes, substitutions, and modifications without departing from the spirit and scope of the present disclosure. In addition, the protecting scope of the present disclosure is not limited to the processes, machines, manufactures, material compositions, devices, methods and steps in the specific embodiments described in the description. Any person having ordinary skill in the art can understand the current or future developed processes, machines, manufactures, material compositions, devices, methods and steps from the content of the present disclosure, and then, they can be used according to the present disclosure as long as the same functions can be implemented or the same results can be achieved in the embodiments described herein. Thus, the protecting scope of the present disclosure includes the above processes, machines, manufactures, material compositions, devices, methods and steps. Moreover, each claim constitutes an individual embodiment, and the protecting scope of the present disclosure also includes the combination of each claim and each embodiment. The protecting scope of the present disclosure shall be determined by the appended claims.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An image display device, comprising:

a display device having a normal direction and comprising a side edge parallel to a first direction, wherein the first direction is perpendicular to the normal direction;

an optical modulator disposed on the display device, wherein an included angle θ is between the optical modulator and the display device;

a first reference object; and a second reference object disposed on a side of the display device in a second direction and disposed adjacent to the side edge of the display device, wherein the second direction is perpendicular to the normal direction and the first direction;

wherein the included angle θ ranges from 20 degrees to 70 degrees;

wherein the image display device images a projected image on an image-plane, the first reference object is close to the image-plane, and a distance between the first reference object and the image-plane is less than a distance between the second reference object and the image-plane.

2. The image display device according to claim 1, wherein a minimum distance h exists between the optical modulator and the display device in the normal direction, the display device has a light intensity distance maintenance rate α of a light source contained in the display device and a center brightness B, the optical modulator has an optical efficiency η, the optical modulator has a length La, and the minimum distance h is greater than or equal to 10 cm and less than or equal to $$\frac{1}{2}\left(\frac{\log\frac{300}{\eta\times B}}{\log\alpha}\times 100-\frac{La}{\sqrt{2}}\right)\text{ cm.}$$

3. The image display device according to claim 1, wherein a distance between the first reference object and the image-plane in the first direction is less than or equal to 50 cm.

4. The image display device according to claim 3, wherein a distance between the second reference object and the first reference object in the first direction is greater than 50 cm.

5. The image display device according to claim 4, wherein a minimum distance h exists between the display device and the optical modulator in the normal direction, and the distance between the second reference object and the first reference object in the first direction is h+50 cm.

6. The image display device according to claim 4, wherein the second reference object is aligned with a midpoint of the side edge of the display device in the second direction.

7. The image display device according to claim 3, wherein the image display device further comprises a third reference object, a distance between the third reference object and the first reference object in the first direction is greater than 50 cm, and the first reference object is between the display device and the third reference object.

8. The image display device according to claim 1, wherein the display device has a first light intensity in the normal direction;

wherein when an angle between a direction and the normal direction is greater than a first angle φ and less than or equal to 90 degrees, a ratio of a light intensity of the display device in the direction to the first light intensity less than 10%;

wherein the first angle φ and the included angle θ satisfy $$\varphi = \cos^{-1}\left(\frac{\sin\theta}{\sqrt{1+\cos^2\theta}}\right),$$

and the first angle φ is less than or equal to 55 degrees.

9. The image display device according to claim 1, wherein the optical modulator comprises a first sub optical modulator and a second sub optical modulator, the second sub optical modulator is disposed adjacent to the first sub optical modulator, and a connecting material exists between the first sub optical modulator and the second sub optical modulator.

10. The image display device according to claim 9, wherein the connecting material comprises a first refractive index $n_f$, the first sub optical modulator comprises a second refractive index $n_r$, and the first refractive index $n_f$ and the second refractive index $n_r$ satisfy $0.9n_r \le n_f \le 1.1n_r$.

11. The image display device according to claim 10, wherein the connecting material comprises an adhesive material.

12. The image display device according to claim 9, wherein the connecting material is disposed between a sidewall of the first sub optical modulator and a sidewall of the second sub optical modulator.

13. The image display device according to claim 1, wherein the optical modulator is a multiple-reflection optical structure.

14. The image display device according to claim 1, wherein the optical modulator comprises a plurality of lattice structures.

15. The image display device according to claim 1, further comprising an adjusting component, wherein a minimum distance h exists between the optical modulator and the display device in the normal direction, and the adjusting component is configured to adjust the minimum distance h.

16. The image display device according to claim 1, further comprising an adjusting component configured to adjust the included angle θ between the optical modulator and the display device.

17. The image display device according to claim 1, wherein the optical modulator is between the display device and a ground.

18. The image display device according to claim 1, wherein the projected image is projected from an image displayed by the display device through the optical modulator.

19. The image display device according to claim 18, wherein a ratio of a size of the projected image to a size of the image displayed by the display device is greater than or equal to 0.9 and less than or equal to 1.

20. The image display device according to claim 18, wherein the projected image is floating.

* * * * *